United States Patent [19]

Imamura et al.

[11] Patent Number: 5,632,333

[45] Date of Patent: May 27, 1997

[54] TEMPERATURE AND HUMIDITY ADJUSTING APPARATUS AND CONTROL METHOD THEREFOR

[75] Inventors: Toshihide Imamura; Kanichi Kadotani; Katsuyoshi Ito, all of Kanagawa-ken, Japan

[73] Assignee: Kabushiki Kaisha Komatsu Seisakusho, Tokyo, Japan

[21] Appl. No.: 325,428

[22] PCT Filed: Apr. 28, 1993

[86] PCT No.: PCT/JP93/00569

§ 371 Date: Oct. 28, 1994

§ 102(e) Date: Oct. 28, 1994

[87] PCT Pub. No.: WO93/22602

PCT Pub. Date: Nov. 11, 1993

[30] Foreign Application Priority Data

Apr. 30, 1992 [JP] Japan ................... 4-135735
Nov. 30, 1992 [JP] Japan ................... 4-320341

[51] Int. Cl.⁶ .......................................... F24F 3/14
[52] U.S. Cl. .................. 165/228; 165/229; 392/479
[58] Field of Search .................. 165/3, 20, 60, 165/63; 62/3.2; 392/479, 480, 484

[56] References Cited

U.S. PATENT DOCUMENTS

| | | | |
|---|---|---|---|
| 3,040,538 | 6/1962 | Alsing ..................... | 62/3 |
| 3,126,710 | 3/1964 | Boehmer et al. ......... | 62/3 |
| 4,309,592 | 1/1982 | Le Boeuf ................ | 392/479 |
| 4,623,494 | 11/1986 | Gautier et al. .......... | 165/60 |
| 4,632,787 | 12/1986 | Tippmann ............... | 165/60 |
| 4,718,249 | 1/1988 | Hanson ................... | 165/63 |
| 4,745,963 | 5/1988 | Assaf ..................... | 165/60 |
| 4,750,545 | 6/1988 | Hile et al. ............... | 165/20 |
| 4,847,469 | 7/1989 | Hofmann et al. ........ | 392/484 |
| 5,388,180 | 2/1995 | Bayles .................... | 392/484 |

FOREIGN PATENT DOCUMENTS

| | | |
|---|---|---|
| 1238173 | 4/1967 | Germany . |
| 7127058 | 10/1971 | Germany . |
| 51-133943 | 11/1976 | Japan . |
| 59-604281A | 4/1984 | Japan . |
| 61-127363 | 8/1986 | Japan . |
| 61-285327 | 12/1986 | Japan . |
| 62-117437 | 7/1987 | Japan . |
| 4-4819 | 6/1988 | Japan . |
| 2-4147 | 1/1990 | Japan . |
| 2-183741 | 7/1990 | Japan . |
| 3-143522 | 6/1991 | Japan . |

OTHER PUBLICATIONS

International Search Report, Jul. 14, 1993.
German office action dated May 30, 1996.

*Primary Examiner*—Edward K. Look
*Assistant Examiner*—Mark Sgantzos
*Attorney, Agent, or Firm*—Fish & Richardson P.C.

[57] ABSTRACT

A temperature and humidity adjusting apparatus has an air cooling and dehumidifying device, an air heater and a humidifier arranged in order. The air cooling and dehumidifying device includes thermoelements that use the Peltier effect. The humidifier includes hollow yarn bodies, each of which are formed by winding metal wire that serves as a heater on the outer periphery of a hollow yarn that is formed into hollow construction from heat resistant fiber. The humidifier also includes means for supplying water to each of the hollow yarn bodies and a power supply that supplies power to the metal wire.

5 Claims, 5 Drawing Sheets

TEMPERATURE AND HUMIDITY ADJUSTING APPARATUS AND CONTROL METHOD THEREFOR

TECHNICAL FIELD

The present invention relates to a temperature and humidity adjusting apparatus for obtaining temperature and humidity controlled air and a control method therefor.

BACKGROUND ART

In a conventional temperature and humidity adjusting apparatus, a heat pump may be employed for temperature adjustment and a pot type humidifier may be employed for humidification.

On the other hand, as a method for precisely controlling the temperature and humidity adjusting apparatus, temperature and humidity are controlled on the basis of an air temperature and a relative humidity at a temperature and humidity adjusting air outlet of the temperature and humidity adjusting apparatus to obtain air having a predetermined temperature and humidity at the outlet.

On the other hand, in the conventional control method, precision of the humidifier cannot be high enough. Namely, since the humidifier does not permit delicate control, humidity at an outlet of a cooling and dehumidifying portion is once lowered to be much lower than a set humidity, and then humidity for the difference to the set humidity is added by a humidifier to obtain a predetermined humidity.

However, in the above-mentioned conventional temperature and humidity adjusting apparatus, a compressor has to be employed for the heat pump and so forth. Therefore, the temperature and humidity adjusting apparatus inherently becomes bulky and possibly generates vibration. Also, difficulty arises due to fluorocarbons being employed in the compressor. Furthermore, since the pot type humidifier is employed, humidity response speed is low.

Also, in the conventional control method, since control is performed depending upon relative humidity, humidification control has to be performed while constantly monitoring temperature variation. Accordingly, adjusting the temperature and humidity of the air at the outlet to set values may take a long time.

On the other hand, the amount of energy required for cooling and dehumidification may become substantially large, which is contrary to desires for energy conservation. Furthermore, under certain conditions, water may condense on the apparatus and freeze.

As a solution for these problems, when temperature and humidity control are performed on the basis of absolute humidity, a concrete method for deriving the absolute humidity from the relative humidity becomes necessary. Also, since control on the basis of the absolute temperature uses a shorter time period to reach the target temperature and humidity than control on the basis of the relative humidity, a more responsive humidifier becomes necessary.

Also, precisely controlling the humidity without lowering the absolute humidity of the air at the outlet of the cooling and dehumidifying portion below the absolute humidity setting requires that the cooling and dehumidifying portion and the humidifier be precisely controllable.

Therefore, it is an object of the present invention to provide a temperature and humidity adjusting apparatus which can be more compact and lighter weight in comparison with the conventional apparatus and free of vibration, and furthermore can improve respective precision in temperature control and humidity control.

Another object of the present invention is to provide a control method which can quickly and precisely reach a temperature and humidity setting that saves energy, permits precise control with less performance required from the cooling and dehumidifying portion and permits further reduction in the size of the apparatus.

DISCLOSURE OF THE INVENTION

In order to accomplish the above-mentioned and other objects, according to one aspect of the invention, a temperature and humidity adjusting apparatus includes an air cooling and dehumidifying device, an air heater, and a humidifier. The air cooling and dehumidifying device includes thermoelements that use the Peltier effect. The humidifier includes hollow yarn bodies, each of which is formed by winding metal wire that serves as a heater on the outer periphery of a hollow yarn formed into a hollow construction using heat resistant fibers. The humidifier also includes a device for supplying water to the hollow yarn fibers and a power supply for supplying power to the metal wire.

It should be noted that a blower may be placed at any position in the apparatus, such as downstream of the humidifier.

Employing thermoelements rather than a compressor as cooling means in the air cooling and dehumidifying device permits the device to be smaller in size and weight and also eliminates vibrations and emission of fluorocarbons. Also, using a hollow yarn body as the humidifier and the metal wire as a heater for the humidifier permits the device to be more compact and to respond more quickly and precisely.

It should be noted that when the air heater is constructed with a string body formed of a heat resistive fiber and uses metal wire wound around the string body and a power supply connected to the metal wire, the air heater can be compact and can enable high precision control and quick response in humidification and heating temperature.

According to the second aspect of the invention, a temperature and humidity adjusting apparatus includes an air cooling and dehumidifying device, an air heater, and a humidifier. The air cooling and dehumidifying device includes thermoelements that use the Peltier effect. The humidifier includes hollow yarn bodies formed by winding metal wire on the outer periphery of hollow yarn that is formed into a hollow construction using heat resistant fibers, a water supply to the hollow yarn bodies and a power supply to the metal wire.

A method for controlling the temperature and humidity adjusting apparatus includes measuring the temperature and relative humidity at an outlet, calculating the corresponding absolute humidity, deriving the difference between the measured temperature at the outlet of the apparatus and a set temperature, setting the heater and cooling and dehumidifying device to adjust for the difference, calculating the difference between the measured temperature at the outlet of the apparatus and a set temperature and resetting the heater and cooling and dehumidifying device to adjust for the difference, and calculating the difference between the absolute humidity at the outlet and the set absolute temperature and resetting the humidifier and the cooling and dehumidifying device to adjust for the difference.

The desired humidity can be reached quickly and accurately without having the humidity fall below the humidity setting. Also, since the cooling and dehumidifying device can be reduced in size, the cost of the device can be lowered.

BRIEF DESCRIPTION OF THE DRAWING

The present invention will be understood more fully from the detailed description given herebelow and from the accompanying drawings of the preferred embodiment of the present invention, which, however, should not be taken to limit the invention, but are provided for clarification purposes only.

In the drawings.

BEST MODE FOR IMPLEMENTING THE INVENTION

The preferred embodiment of a temperature and humidity adjusting apparatus and its control method according to the present invention will be discussed with reference to FIGS. 1 to 5.

First, one embodiment of a temperature and humidity adjusting apparatus according to the present invention will be discussed with reference to FIGS. 1 to 3.

Figure 1:
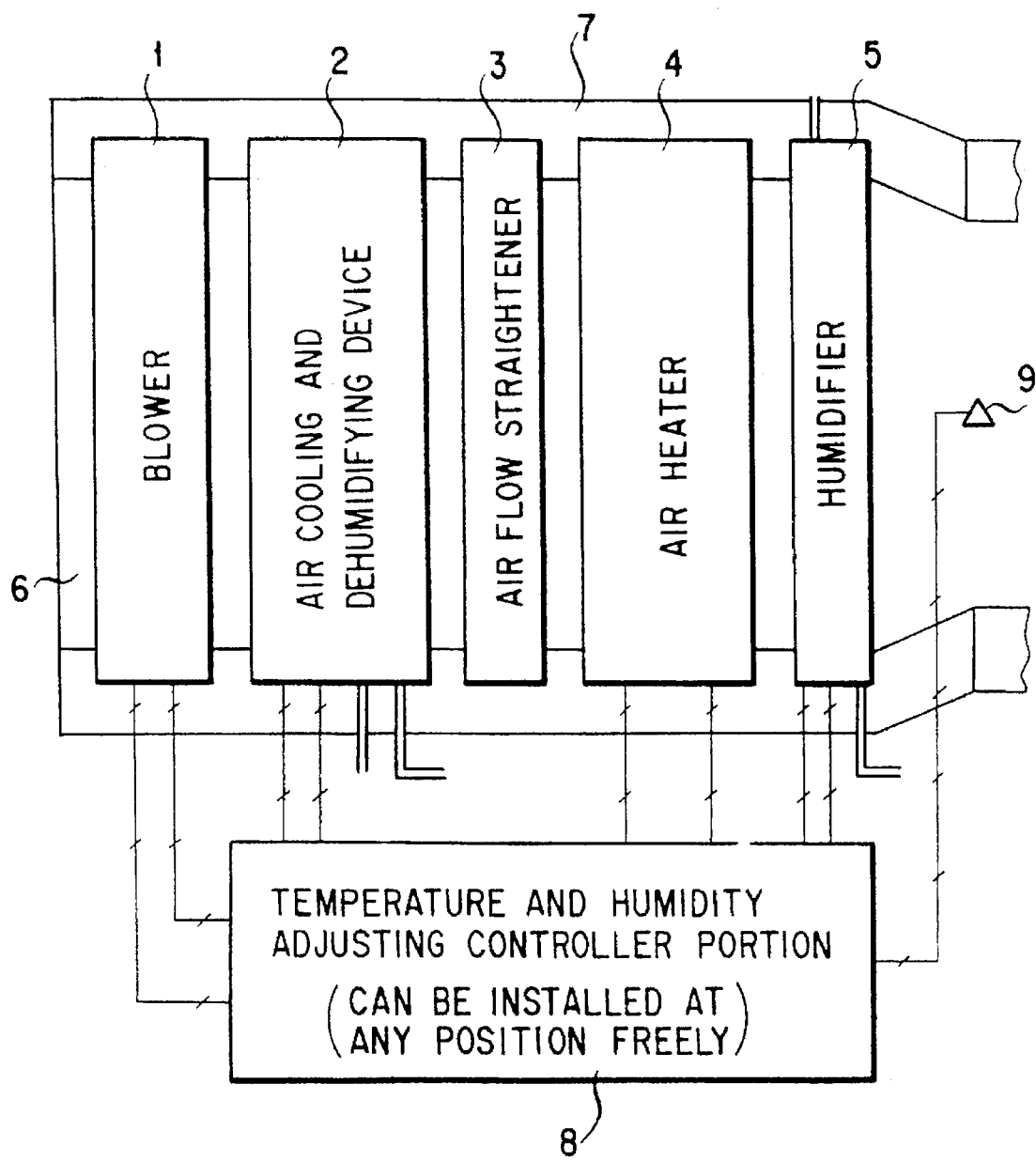
FIG. 1 is an illustration showing one embodiment of a temperature and humidity adjusting apparatus according to the present invention.

FIG. 1 shows the overall construction of the temperature and humidity adjusting apparatus according to the invention. In the drawings, 1 denotes a blower, 2 denotes an air cooling and dehumidifying device, 3 denotes a air flow straightener, 4 denotes an air heater, 5 denotes a humidifier. These components are arranged in series with placing the blower 1 at the most upstream side. A periphery of an air flow passage 6 extending through these components are surrounded by a heat insulating layer 7. 8 denotes a control portion for controlling respective of the above-mentioned components, 9 denote a sensor provided at the most downstream side. It should be noted that the reason of employment of the above-mentioned air cooling and dehumidifying device 2 is for regulating an intake air temperature and humidity at predetermined values. In the above-mentioned blower 1, an ordinary fan is employed. It should be noted that the blower 1 is not necessarily positioned at the most upstream side and can be placed in any position as long as air flow can be generated within the apparatus.

Figure 2:
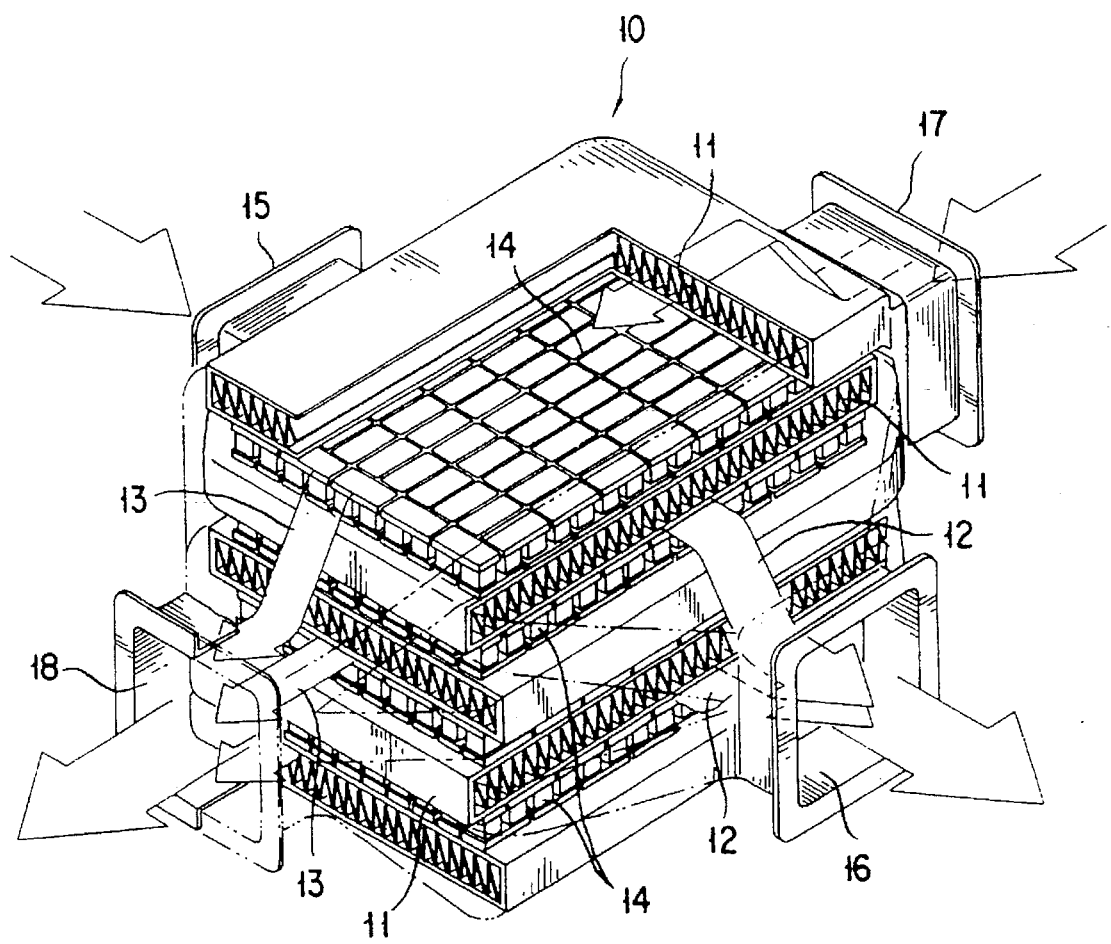
FIG. 2 is a partially cut-out perspective view of a heat exchanger employed in the foregoing embodiment.
Figure 3:
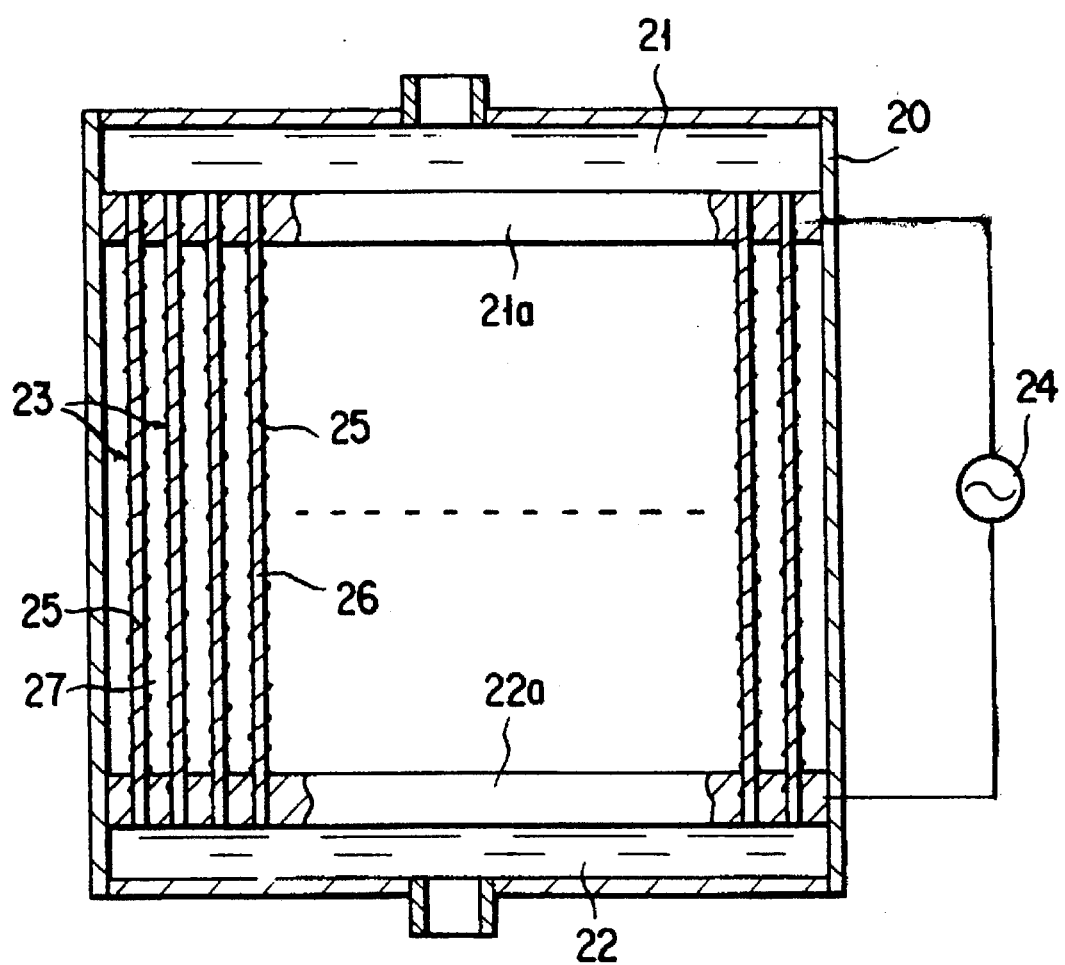
FIG. 3 is a section showing one example of a humidifier to be employed in the foregoing embodiment.

The first cooling and dehumidifying device 2 employs a heat exchanger 10 as shown in FIG. 2. The heat exchanger 10 is constructed by stacking water passages 12 having fins 11 with air passages 13 in an intersecting manner and by arranging a plurality of thermoelements 14 on the wall surfaces of the stack. The water passages 12 are then connected with a water flow inlet 15 and an a water flow outlet 16. The air passages 13 are connected with an air flow inlet 17 and an air flow outlet 18. The thermoelements 14 are in contact with the walls of the air passages at the cooling sides and with the walls of the water passages at the heating sides by Peltier effect.

Therefore, in the heat exchanger 10 forming the air cooling and dehumidifying device 2, the air flowing through the air passages 13 is cooled and dehumidified by the thermoelements 14. At this time, the heat is transmitted to the water flowing through the water passages 12 and thus removed. An ordinary fin is used as the air flow straightener 3 and an electric heater is used as the air heater 4. The humidifier 5 is constructed as shown in FIG. 3.

The humidifier 5 has upper and lower water tanks 21 and 22 supported by a support frame 20. Between mating wall portions 21a and 22a of the water tanks 21 and 22a plurality of hollow yarn bodies 23 are stretched. Respective ends of each hollow yarn bodies are connected to water tanks 21 and 22 respectively. Both wall portions 21a and 22a are formed of conductive materials. A power source 24 is connected to both wall portions 21a and 22a. Metal wires 25 that heat the respective hollow yarn bodies 23 are supplied with power at the wall portions 21a and 22a. Between the wall portions 21a and 22a, an air flow passage 27 is formed. Each hollow yarn body 23 is exposed to the air flowing therethrough.

The hollow yarn body 23 comprises a hollow yarn 26 that may be fabricated using twill weave, plain weave or other materials comprised of heat-resistive long fiber filaments, and metal wire 25 wound on the outer periphery of the hollow yarn 26. The metal wire 25 functions as a heater and electricity can be applied at both ends.

In the humidifier 5, water flows through the hollow yarn 26 and electric power is supplied to the metal wire 25. The water is percolated to the outer surface of the hollow yarn 26. The percolated water is evaporated by the heat generated by the metal wire 25.

The material used for manufacturing the long fiber filament forming the hollow yarn 26 of the humidifier 5 may be made of heat resistant materials such as aromatic polyamide, polyamide, aromatic polyester, glass fiber, and further ceramic fibers made of alumina, silica alumina and so forth. The hollow yarn 26 has a thickness with an external diameter in the order of 0.5 to 5.0 mm and an internal diameter in the order of 0.4 to 4.5 mm.

The metal wire 25 wound around the outer periphery of the hollow yarn 26 has a diameter in the order of 0.008 to 0.1 mm. The material of the metal wire may be selected from metals used in ordinary heaters, such as steel, stainless steel, kanthal alloy, and nichrome. The metal wire 25 is wound onto the hollow yarn 26 in spiral fashion when a single wire is used, and in an alternately intersecting manner when two or more wires are used.

Sufficient thermal energy cannot be produced by the power supply to the metal wire 25 when a gap is present between the external surface of the hollow yarn 26 and the wire. This can cause local heating which affects the temperature and humidity. For this reason, the wire must be wound close to the surface of the hollow yarn.

In one embodiment of the hollow yarn body 23, the hollow yarn 26 is formed by weaving of 12 to 120 in number of long fiber of glass fiber to have a diameter of 0.5 to 5 mm. The metal wire 25 wound on the hollow yarn has a diameter of 0.05 to 0.5 mm and formed of the material of SUS, kanthal alloy, nichrome and so forth. Two to six metal wires are wound on the hollow yarn 26 in an alternately intersecting manner.

The humidifier 5 may be used as an air heater 4 in place of the normal electric heater when no water is passed through the humidifier. Namely, the air heater 4 may be constructed by winding the metal wires to be the heater on a string form body formed of heat resistive fiber and by connecting a power supply means to the metal wire.

Figure 4:
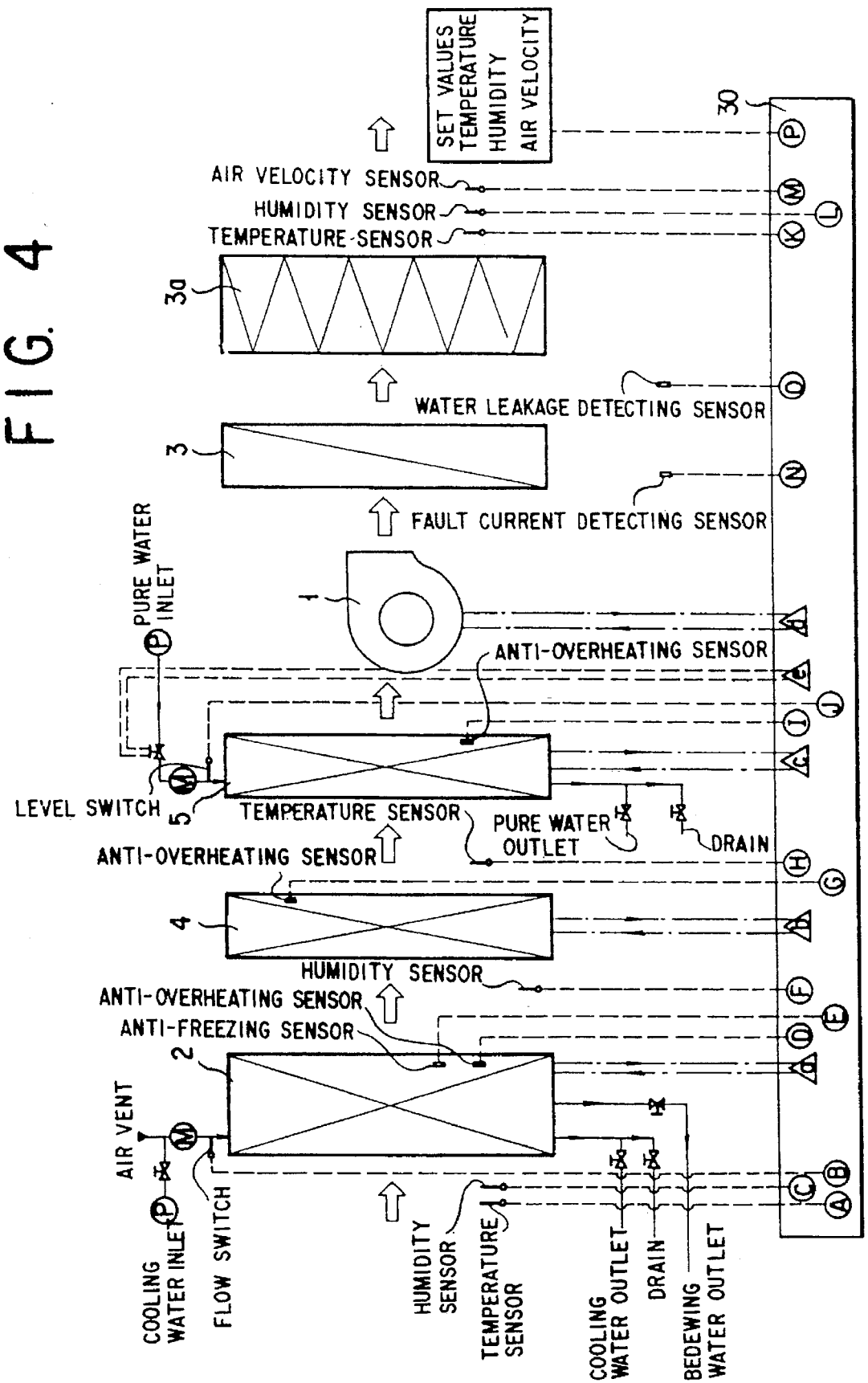
FIG. 4 is a schematic illustration showing a mounting portion of a sensors for control and a control system.

One example of a method for controlling temperature and humidity in the temperature and humidity adjusting apparatus shown in FIG. 1 is shown in FIG. 4. FIG. 4 shows sensors for control to be mounted on respective components of the temperature and humidity adjusting apparatus shown in FIG. 1 and positions on which the sensors are mounted. It should be noted that, in the construction shown in FIG. 4, the blower 1 is arranged downstream of the humidifier 5. While FIG. 4 shows only the interface portion, the detected values A to P of respective sensors are input to a control unit 30 and calculated values a to d on the basis of the detected values are input to the air cooling and dehumidifying device 2, the air heater 4, the humidifier 5 and the blower 1. It should be noted that the operating conditions on the basis of the input values are fed back from respective components 1 to 4. 3a denotes a filter.

A concrete control algorithm is used to control temperature and humidity in the temperature and humidity adjusting apparatus.

(1) Temperature Control

The temperature is controlled by feeding back a temperature difference with respect to the target temperature. Namely, from an outlet temperature $T_{out}$ and a target temperature $T_{obj}$, an error e is derived from:

$$e = T_{obj} - T_{obj}$$

Then, an operational magnitude u(k) of the air heater 4 and the air cooling and dehumidifying device 2 on the basis of the error e is derived from the following equation:

$$u(1) = u(k-1) + (Kg + Ki + Kd) \times e(k) - (Kg + 2 \times Kd) \times e(k-1) + Kd \times e(k-2)$$

wherein u(k): current operational level;

u(k−1): immediately preceding operational level;

e(k): present error amount;

e(k−1): immediately preceding error amount;

e(k−2): error amount calculated in the second to last reading;

T: sampling period;

Kg: =K×Kp: proportional gain; (here K=M/P, K p=I)

M: maximum output value (%)

P: proportional band (°C.);

Ki: =K×Ti/T: integral gain.

Ti integration period (sec)

Kd: =K×Td/t: differential gain

Td: differential period (sec)

(2) Humidity Control

Humidity is brought to the desired level by controlling absolute water content (absolute humidity).

(1) A current absolute humidity x1 at the outlet is derived from the outlet temperature $T_{out}$ and the outlet humidity $W_{out}$ (2) A target absolute humidity x2 at the outlet is derived from a control target temperature (set value) $T_{obj}$ at the outlet and a control target humidity (set value) $W_{obj}$ at the outlet.

(3) An error e (=x2−x1) is derived from absolute humidities x1 and x2.

(4) Operational magnitude u(k) of the humidifier 5 and the air cooling and dehumidifying device 2 is derived from the following equation.

$$u(k) = u(k-1) + (Kg + Ki + Kd) \times e(k) - (Kg + 2 \times Kd) \times e(k-1) + Kd \times e(k-2)$$

The symbols correspond to respective elements listed in the temperature control.

(3) Calculation of Absolute Humidity

Assuming that a relative humidity is $\psi(\%)$ and dry temperature is t (°C.), the absolute humidity x can be expressed by:

$$x = 0.622 \times \psi \times ps/(P - \psi \times ps) \ (Kg/Kg') \quad (1)$$

and the relative humidity $\psi$ can be expressed on the basis of water vapor partial pressure as follows:

$$\psi = p/ps \ (\%) \quad (2)$$

wherein p: water vapor partial pressure in a wet air (mmHg)

ps: water vapor partial pressure in saturated wet air (mmHg)

P: total pressure of wet air (mmHg)

The water vapor partial pressure ps of the saturated wet air is equal to the saturated vapor pressure of the water at the current temperature and can be expressed by the following equation (3) (Wexler Hgland's equation):

$$\log ps = -5.8002206 \times 10^3/T + 1.3914993 - \\ 4.8640239 \times 10^{-2} \times T + 4.1764768 \times 10^{-5} \times T^2 - \\ 1.4452093 \times 10^{-8} \times T^3 + 6.5459673 \times \log T = y \quad (3)$$

wherein

T: absolute temperature $$T = t + 273.15(k)$$

Accordingly, $$ps = 3^y$$

Figure 5:
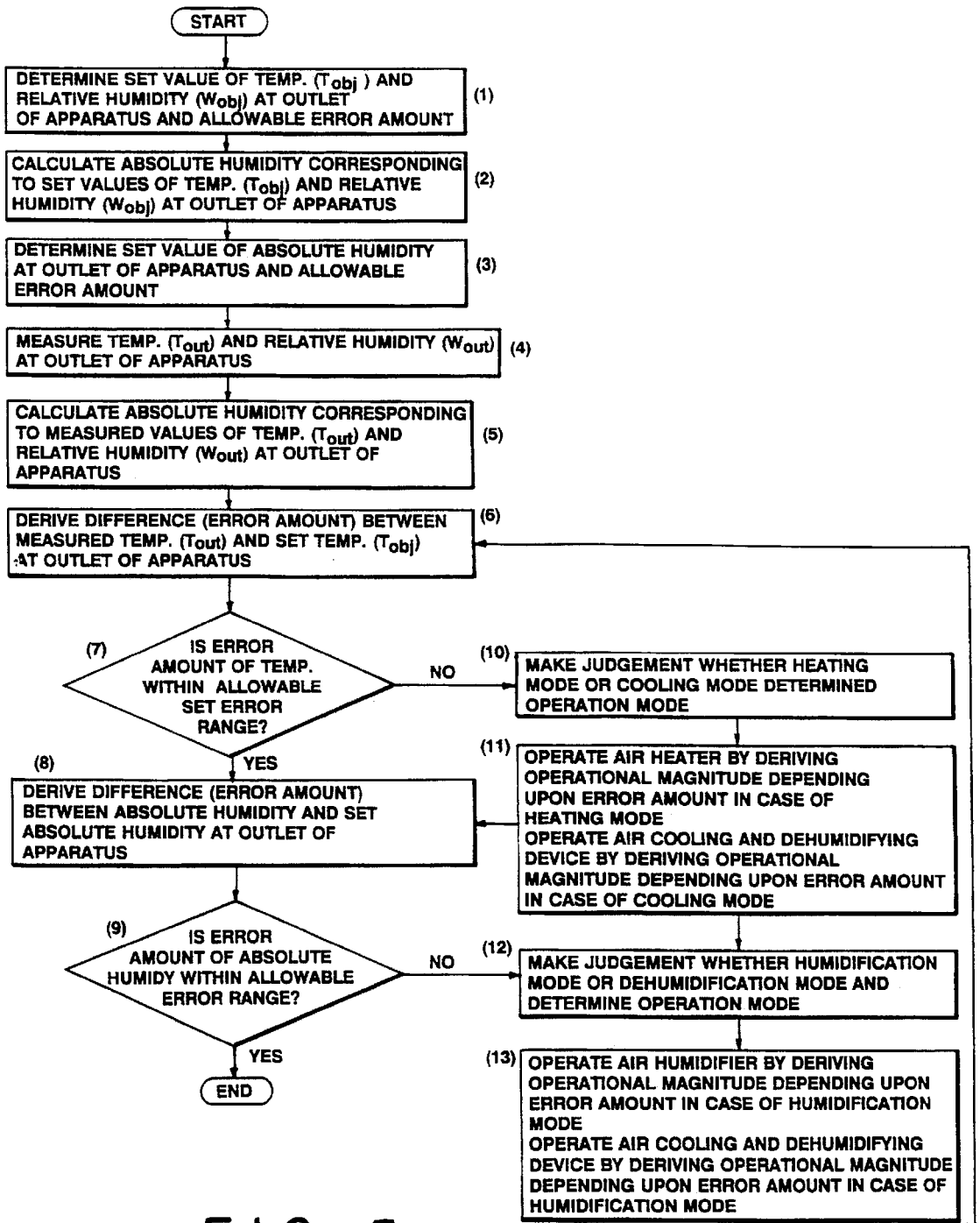
FIG. 5 is a flow chart showing an algorithm of control in one embodiment of a control method according to the present invention.

Next, the control algorithm used during operation will be discussed with reference to FIG. 5.

First, the temperature and relative humidity are set at the outlet of the apparatus and the allowable error range in operation of the temperature and humidity adjusting apparatus is calculated (step 1).

Next, the absolute humidity with respect to set temperature and relative humidity at the outlet of the apparatus is calculated (step 2) and an allowable error range is calculated (step 3).

It should be noted that the foregoing steps (1) to (3) may be performed before initiation of the operation.

Then, the temperature and the relative humidity at the outlet of the apparatus under the current operating condition are measured (step 4). Thereafter, the absolute humidity with respect to the current temperature and the current relative humidity are calculated (step 5).

Next, the difference between the temperature measured at the outlet of the apparatus and the set temperature (i.e., the error amount) is derived (step 6). It is then determined whether the difference is within the set allowable error range (step 7). If the difference falls within the set allowable error range (Yes), the difference between the absolute humidity at the outlet of the apparatus and the set absolute humidity is derived (step 8). It is then determined whether the difference is within the set allowable error range determined at the step (3) (step 9). If the difference falls within the allowable error range, control is terminated and operation is continued in unchanged condition.

On the other hand, when the error amount of the temperature is out of the set allowable error range as checked at the step (7), the apparatus determines whether heating mode or cooling mode is required based on the difference (step 10).

Then, when the apparatus selects the heating mode, the operational level is determined based on the temperature difference to operate the air heater 4. On the other hand, when the required mode is the cooling mode, the operational level is also based on the temperature difference and the air cooling and dehumidifying device 2 is turned on (step 11).

After performing operation at the step (11), steps (8) and (9) are performed.

When the set error amount of the absolute humidity is out of the allowable error range (No), it is determined whether humidification mode or dehumidification mode is required based on the humidity difference (step 12). When it is determined that more humidity is needed, the operational level of the humidifier 5 is determined on the basis of the humidity difference. On the other hand, when it is determined that dehumidification is needed, the operational level of the air cooling and dehumidifying device 2 is determined on the basis of the humidity difference (step 13).

After step (13), control at the respective steps as in step (6) is then repeated.

It should be noted that one example of the temperature and humidity adjusting apparatus used for performing the control function is a cooling and dehumidifying device 2 performing at 1,290 kcal/hr using forty-eight thermoelements and cooling water at a temperature of 25° C. Also, a finned sheathed heater having 1,500W of maximum capacity is used for the air heater 4, and a heater, having a heating capacity of 1,000 W at maximum and being made of eighteen meter element formed by winding eight 0.1 mm diameter of SUS 304 wires, in alternately intersecting manner, on the outer periphery of a string form body formed by combining sixteen glass fibers is used as a subheater.

Furthermore, for the humidifier 5, a hollow yarn body 23 having 5.3 Ω/cm of electric resistance was formed by winding eight 0.03 mm diameter of SUS 316 wires, in alternately intersecting manner, on the outer surface of hollow yarn 26 made of glass fiber and having 1.6 mm of external diameter and 1.0 mm of internal diameter. By employing the hollow yarn bodies 23 thus formed, the heater 5, in which the length of individual hollow yarn body 23 is 65 cm, was constructed.

When the temperature and humidity adjusting apparatus is used, since the main heater has small thermal inertia, high response speed can be achieved. Also, since the hollow yarn has small thermal inertia so as not to heat excess water. Therefore, only calories corresponding to the latent heat of vaporization must be compensated for by the energy of the air. This makes control easier so as to achieve high precision and fast humidity control.

Although the invention has been illustrated and described with respect to exemplary embodiment thereof, it should be understood by those skilled in the art that, in addition to the foregoing, other changes, omissions and additions may be made therein and thereto, without departing from the spirit and scope of the present invention. Therefore, the present invention should not be understood as limited to the specific embodiment but to include all possible embodiments within a scope encompassed and equivalents thereof with respect to the features set out in the appended claims.

INDUSTRIAL APPLICABILITY

The present invention is can be used to operate an air conditioner in a clean environment or in an environment requiring high precision temperature and humidity control required in production of semiconductors, biotechnology and other situations.

We claim:

1. A temperature and humidity adjusting apparatus comprising an air cooling and dehumidifying device, an air heater, and a humidifier, wherein:

said air cooling and dehumidifying device includes thermoelements that utilize the Peltier effect; and said humidifier includes:

a plurality of hollow yarn bodies, each said yarn body including a hollow yarn formed from fiber and metal wire that heats when supplied with electrical power, each said yarn body being formed by winding metal wire on an outer periphery of the hollow yarn;

means for supplying water to each of said hollow yarn bodies; and power supply means for supplying electrical power to said metal wire.

2. A temperature and humidity adjusting apparatus as set forth in claim 1, wherein the fiber is made from a material selected from the group consisting of aromatic ployamide, polyimide, aromatic polyester, glass fiber and ceramic fiber made of alumina, silica alumina or similar materials.

3. A temperature and humidity adjusting apparatus as set forth in claim 1, wherein a hollow yarn body includes at least one metal wires wound on the external surface of the hollow yarn in spiral fashion.

4. A temperature and humidity adjusting apparatus as set forth in claim 1, wherein the hollow yarn has an external diameter of approximately 0.5 to 5.0 mm and an internal diameter of approximately 0.4 to 4.5 mm, and the metal wire has a diameter of approximately 0.008 to 0.1 mm.

5. A method for controlling a temperature and humidity adjusting apparatus that includes an air cooling and dehumidifying device, an air heater, and a humidifier, the air cooling and dehumidifying device including thermoelements that use the Peltier effect, and the humidifier including:

a plurality of hollow yarn bodies, each of which includes a hollow yarn formed from fiber and metal wire that heats when supplied with electrical power, and each of which is formed by winding the metal wire on the outer periphery of the hollow yarn, means for supplying water to each of the hollow yarn bodies, and power supply means for supplying electrical power to the metal wire, the method for controlling the temperature and humidity adjusting apparatus comprising the steps of:

measuring a temperature and a relative humidity at an outlet of said temperature and humidity adjusting apparatus, calculating an absolute humidity corresponding to said relative humidity, deriving a temperature error amount between the measured temperature at the outlet of the apparatus and a set temperature, operating one of the air heater and the air cooling and dehumidifying device based upon the temperature error amount, deriving a humidity error amount between the absolute humidity at the outlet of the apparatus and a preliminarily derived set absolute temperature, and operating one of the humidifier and the air cooling and dehumidifying device based upon the humidity error amount.

* * * * *